July 10, 1962   J. TH. VERHAPPEN   3,043,315
TOBACCO THRESHING-WINNOWING MACHINES
Filed March 10, 1959   2 Sheets-Sheet 1
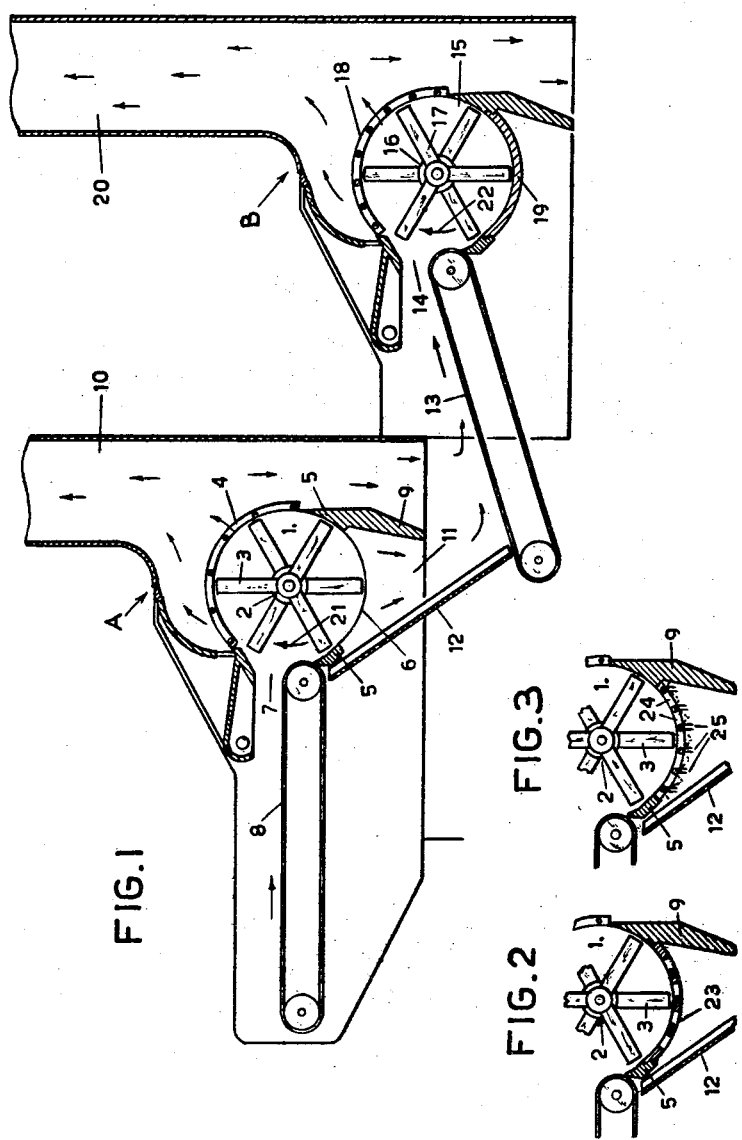

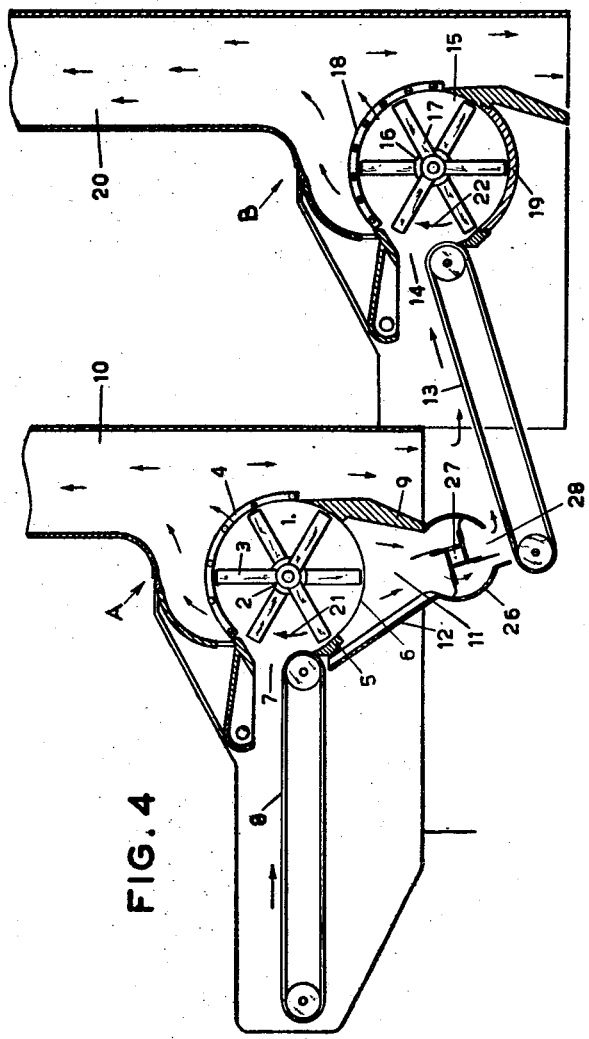

United States Patent Office 3,043,315
Patented July 10, 1962

3,043,315
TOBACCO THRESHING-WINNOWING MACHINES
Jacobus Th. Verhappen, Eindhoven, Netherlands, assignor to Koninklijke Vereenigde Tabaksindustrieen Mignot & de Block N.V., Eindhoven, Netherlands, a company of the Netherlands
Filed Mar. 10, 1959, Ser. No. 798,423
Claims priority, application Netherlands Mar. 19, 1958
3 Claims. (Cl. 131—146)

The invention relates to a machine for threshing tobacco leaves and for winnowing the leaf parts obtained by the threshing process, comprising a threshing chamber, a threshing drum contained in said chamber, a separating shaft in which an upflowing current of air is produced by suction, a casing and a wall surrounding said threshing chamber, an opening provided in said casing for the supply of tobacco leaves to said chamber and a grid forming part of said wall and constituting a part of the partition between said threshing chamber and said separating shaft.

In combined threshing-winnowing machines known in the art only a part, i.e. at most one half of the circumference, of the wall surrounding the threshing chamber is constructed as a grid and the remaining part of said wall is closed or at most provided with small holes for the discharge of sand and dust. These machines have the disadvantage that, when the threshing chamber receives too many leaves, a number of leaves and leaf parts are beaten to a pulp against the closed wall part, so that a great percentage of so-called short-scrap is produced. In order to avoid this disadvantage, a wall part as large as possible has been formed as a grid. However, in these machines the grid still remained the partition between the threshing chamber and the separating shaft, so that all leaf parts discharged from the threshing chamber landed through the grid into the separating shaft. Although the threshing apparatus now could operate with a greater capacity, the effect thereof was rather small, since the separating shaft was no longer capable of separating leaf portions and stems well.

According to the invention it has appeared that the effect of the combined threshing-winnowing machine can be made much greater, if the threshing apparatus is given a capacity as great as possible and only a portion of the mass of disintegrated leaves is supplied to the separating shaft associated with said threshing apparatus and the remaining part of said mass is discharged outside said separating shaft for its further treatment.

The threshing-winnowing machine for carrying into effect the described method is provided both with a discharge opening in the wall surrounding the threshing chamber and lying, as seen in the direction of rotation of said threshing drum, after the grid mounted between said drum and said separating shaft, and with a device for collecting leaf portions communicating outside the separating shaft with said discharge opening. This collecting device may comprise a conveyor belt and a discharge funnel mounted above said belt and connected in communication with the discharge opening provided in the wall surrounding the threshing chamber. The conveyor belt may extend under the lower end of the separating shaft so as to receive both the products discharged by the funnel and the stems discharged from the separating shaft. These stems may still have some leaf parts hanging thereon. The conveyor belt may transport these products and stems to a second threshing or a second separating apparatus or to a following combined threshing-winnowing machine.

A grid, which may be readily changeable, may be provided in the opening for the discharge from the threshing chamber of leaf parts bypassing the separating shaft. This second grid may be provided with openings having adjustable passage areas, if desired.

In a combined threshing-winnowing machine of the described construction the difficulty may be encountered that through the discharge opening in the lower region of the wall surrounding the threshing chamber so much air is sucked into the machine, that the upflowing air current in the lower end portion of the separating shaft for the discharge of the leaf stems becomes too weak to carry the larger leaf parts received in said end portion of the shaft upwardly. Then, too, many leaf parts will be discharged together with the stems. When in that case the stems and the leaf parts still hanging thereon are treated in a second machine the leaf parts which are already torn off the stems will be further disintegrated and mashed in said second machine. However, for cigarettes the leaf parts torn off the stems must be as large as possible. This disadvantage can be entirely avoided when a sluice door is mounted in the discharge funnel, letting the tobacco leaf portions pass intermittently and preventing the air from being sucked into the machine through the extra discharge opening of the threshing chamber.

For the elucidation of the invention reference is made to the accompanying drawing, which diagrammatically illustrates a combined threshing-winnowing machine according to the invention.

In the drawing:

FIG. 1 is an elevational sectional view of two combined threshing-winnowing machines arranged in cascade, the first one being constructed in accordance with the invention, FIG. 2 is an elevational sectional view of a detail of this machine, FIG. 3 is an elevational sectional view of a variant of the detail shown in FIG. 2, and FIG. 4 is an elevational sectional view of two machines arranged in cascade, the first one being constructed in accordance with the invention and being provided with a sluice door.

In FIGS. 1 and 4 a combined threshing-winnowing machine according to the invention is designated by A and a normal threshing winnowing machine arranged in cascade behind the machine A is designated by B. The threshing chamber of the first machine is shown at 1. This chamber contains a rotary threshing drum 2, provided with beating bars 3. The threshing chamber 1 is surrounded by a casing the upper wall of which is partly constructed as a grid 4 and the lower wall 5 has a large opening 6. Between the upper wall and the lower wall there is an opening 7 for the supply of tobacco leaves, which are fed into the machine by means of a conveyor belt 8.

The threshing chamber 1 is separated from the separating shaft 10 by grid 4 and a partition 9 associated with the lower wall 5. In a manner not shown, an upflowing current of air is produced in the separating shaft by suction.

The opening 6 of the wall surrounding the threshing chamber 1 communicates with a collecting space 11, which is confined by the partition 9, an inclined plate 12 and the side plates (not shown) of the machine. This collecting space is open at its lower end and is mounted above a conveyor belt 13. The plate 12 makes sure that the leaf parts discharged from the collecting space 11 fall upon the conveyor belt 13 in good order.

The conveyor belt 13 also extends under the lower end of the separating shaft 10 and transports the products falling from the collecting space 11 and the separating shaft 10 towards the supply opening 14 of a second threshing-winnowing machine having a threshing chamber 15, a rotary threshing drum 16 provided with beating bars 17 and both a grid-shaped upper wall 18 and a closed lower wall 19 surrounding the threshing chamber 15. There is also a separating shaft 20, in which an upflowing current of air is produced by suction.

The threshing drums 2 and 16 rotate in the direction of the arrows 21, 22. Consequently, the beating bars 3 and 17 throw the incoming leaves and leaf parts upwards against the grids 4 and 18.

If a quantity of tobacco leaves are fed by the conveyor belt 8 into the threshing chamber 1 of the machine A, the leaves are instantly torn in pieces by the beating bars 3 of the threshing drum 2 and a certain amount of the mixture of leaf parts and stems, which still may have some pieces of leaf hanging thereon, is flung and sucked through the grid 4 into the separating shaft 10. The remaining quantity of the mixture of leaf parts and stems is carried along by the threshing drum a little further and is discharged through the opening 6. In the separating shaft 10 the lighter leaf parts are carried along upwards and separated from the heavier leaf stems, which fall against the flow of air out of said shaft. The mixture of leaf parts and stems passing the opening 6 and the collecting space 11, as well as the stems falling out of the separating shaft 10, fall upon the conveyor belt 13 and are fed by the latter into the threshing chamber 15 of the machine B. The leaf parts arriving in said second threshing chamber are flung and sucked through the grid 18 into the separating shaft 20 without much damage, since they are relatively light, and the stems, which offer more resistance to the rapidly rotating beating bars, are first freed from the leaf pieces still hanging thereon and, together with these pieces, also flung through the grid 18 into the shaft 20. In this shaft the light leaf parts are carried upwards by the air current and the naked stems fall down, for instance into a collecting container.

The advantage of the arrangement according to the invention is that it is possible to feed the threshing chamber 1 of machine A with about twice the quantity of tobacco leaves as a machine, in which the opening 6 in the bottom of the casing surrounding the threshing chamber does not exist. About half the quantity of leaves are separated in a normal manner in the separating shaft 10. The remaining quantity of leaves, which then are predisintegrated, is fed into the threshing-winnowing machine B together with the stems falling out of the shaft 10. In that case both threshing-winnowing machines operate with about the same load. Consequently, the two machines partly arranged in cascade have twice the capacity of a single machine. In former threshing-winnowing machines arranged in cascade all leaf material had to be separated in the first separating shaft, so that the first machine defined the capacity of the combination. Only a small portion of all leaf parts and all stems was fed into the second threshing-winnowing machine and for the separation of these leaf parts and these stems a machine of smaller capacity sufficed. In order to raise the capacity of the total threshing-winnowing arrangement as high as possible and to keep the cost of the arrangement as low as possible two or three primary threshing-winnowing machines operating in parallel were placed before one single secondary threshing-winnowing machine, so that for an arrangement having two or three times the capacity of a single machine three or four machines were necessary, which made each machine operate with a capicity of only 67% and 75% respectively. On the other hand, in the arrangement according to the invention only two machines are required to obtain the double capacity so that each machine operates with a capacity of 100%.

Since the ratio between the quantity of mixture passing through the grid 4 and the quantity of mixture discharged through the opening 6 is important for the total capacity of the cascade arrangement, it may be advantageous to provide also a grid in the opening 6. Such a grid is designated in FIG. 2 by 23. This grid may be replaced by a grid having other apertures or slots. Instead of replaceable grids, a grid having adjustable passage areas may be used. In FIG. 3 the grid 24 is provided with flaps 25, by means of which the passage areas between the grid rods may be adjusted. The flaps 25 are illustrated in FIG. 3 and are in the nature of gates which may be used to partially close the openings in the grid 24. These flaps are shown in solid lines to indicate their retracted position, wherein maximum opening of the grid is provided, and the showing in broken lines indicates their closed position wherein passage through the grid is restricted. For the same purpose sliding members may also be used.

In the embodiment illustrated in FIG. 4, a rotary sluice door 27 contained in a housing 26 is provided below the discharge opening 6 of the threshing winnowing machine A. This sluice door lets the leaf parts falling out of the threshing chamber 1 pass intermittently and prevents air from being sucked into the separating shaft 10 through the discharge opening 6, the threshing chamber 1 and the apertures of the grid 4. Due to such an additional air current, the air flow in the lower end portion of the separating shaft 10, i.e., in the shaft portion for the discharge of the naked stems, could become too weak to prevent the leaf parts from being discharged together with said stems.

It will be apparent that, if necessary, three or more threshing-winnowing machines may be arranged in cascade. All machines except the last one will then be constructed in accordance with the invention.

What I claim is:

1. A machine for threshing tobacco leaves and for winnowing the leaf parts resulting from the threshing, comprising, in combination, a threshing chamber, a rotatable threshing drum contained in said chamber, a separating shaft adjacent said chamber and adapted to have an upflowing current of air produced therein by suction, the wall of said threshing chamber being formed with a first discharge opening providing direct communication between said chamber and said separating shaft, a grid provided in said first discharge opening, the wall of said chamber also being provided with a supply opening for the supply of tobacco leaves to the chamber and with a second discharge opening for discharging leaf portions which do not escape from said chamber through said first discharge opening, said second discharge opening being of sufficient size to permit said leaf portions to pass freely therethrough whereby said leaf portions are effectively removed from said threshing chamber through said second discharge opening, said supply opening and said second discharge opening lying, respectively, before and after said first discharge opening in the direction of rotation of said drum, said second discharge opening providing direct communication between the threshing chamber and a space outside the separating shaft for gravity fall of said leaves from said threshing chamber.

2. A machine as defined in claim 1, further comprising a grid provided in said second discharge opening.

3. A machine as defined in claim 1, further comprising a grid provided in said second discharge opening and adjustable means for adjusting the passage areas of said last-named grid.

References Cited in the file of this patent
UNITED STATES PATENTS

| | | |
|---|---|---|
| 2,173,087 | Eissmann | Sept. 19, 1939 |
| 2,701,570 | Eissmann | Feb. 8, 1955 |
| 2,755,930 | Eissmann | July 24, 1956 |
| 2,826,205 | Eissmann | Mar. 11, 1958 |